US010264495B2

(12) United States Patent
Ke et al.

(10) Patent No.: US 10,264,495 B2
(45) Date of Patent: Apr. 16, 2019

(54) METHOD AND APPARATUS FOR CONTROLLING WLAN BEARER

(71) Applicant: Samsung Electronics Co., Ltd., Suwon-si, Gyeonggi-do (KR)

(72) Inventors: Xiaowan Ke, Beijing (CN); Lixiang Xu, Beijing (CN); Hong Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/232,079

(22) Filed: Aug. 9, 2016

(65) Prior Publication Data

US 2017/0048763 A1 Feb. 16, 2017

(30) Foreign Application Priority Data

Aug. 10, 2015 (CN) .......................... 2015 1 0488037
Nov. 6, 2015 (CN) .......................... 2015 1 0752643

(51) Int. Cl.
*H04W 36/00* (2009.01)
*H04W 28/02* (2009.01)
*H04W 84/12* (2009.01)
*H04W 84/04* (2009.01)

(52) U.S. Cl.
CPC ... *H04W 36/0066* (2013.01); *H04W 28/0268* (2013.01); *H04W 84/042* (2013.01); *H04W 84/12* (2013.01)

(58) Field of Classification Search
CPC ......... H04W 28/0268; H04W 36/0066; H04W 84/042; H04W 84/12

USPC .......................................................... 455/434
See application file for complete search history.

(56) References Cited

U.S. PATENT DOCUMENTS

| | | | |
|---|---|---|---|
| 2011/0222523 A1* | 9/2011 | Fu | H04W 36/22 370/338 |
| 2013/0216043 A1 | 8/2013 | Ginzboorg et al. | |
| 2014/0079022 A1 | 3/2014 | Wang et al. | |
| 2014/0204927 A1 | 7/2014 | Horn et al. | |
| 2015/0289186 A1* | 10/2015 | Stalnacke | H04W 48/14 370/236 |
| 2016/0128110 A1* | 5/2016 | Sirotkin | H04W 76/022 370/329 |
| 2016/0302122 A1* | 10/2016 | Masini | H04L 61/1511 |

(Continued)

OTHER PUBLICATIONS

Qualcomm Incorporated et al., 'WLAN Selection and Mobility', R2-152739, 3GPP TSG RAN WG2 Meeting #90, May 16, 2015.
(Continued)

*Primary Examiner* — Timothy X Pham
(74) *Attorney, Agent, or Firm* — Jefferson IP Law, LLP

(57) ABSTRACT

A method for controlling a wireless local area network (WLAN) bearer is provided. The method includes a base station receives information including at least one of WLAN information of a WLAN node, WLAN aggregation response information, WLAN aggregation update response information, WLAN aggregation update information and a WLAN capability of UE. According to the received information, the base station instructs the UE to perform traffic steering between an E-UTRAN and the WLAN, or instructs the UE to perform control processing for the EUTRAN and WLAN aggregation. By using the present disclosure, efficiency of WLAN bearer control is improved.

16 Claims, 18 Drawing Sheets

(56) References Cited

U.S. PATENT DOCUMENTS

2016/0373964 A1* 12/2016 Nagasaka ............. H04W 28/08
2017/0135151 A1* 5/2017 Fujishiro ............. H04W 76/064
2018/0049063 A1* 2/2018 Xu ...................... H04W 28/085
2018/0084544 A1* 3/2018 Xu ...................... H04W 28/085

OTHER PUBLICATIONS

3GPP TR 37.834 V12.0.0, '3GPP; TSG RAN; Study on Wireless Local Area Network (WLAN)—3GPP radio interworking (Release 12)', Jan. 7, 2014.

* cited by examiner

METHOD AND APPARATUS FOR CONTROLLING WLAN BEARER

CROSS-REFERENCE TO RELATED APPLICATION(S)

This application claims the benefit under 35 U.S.C. § 119(a) of a Chinese patent application filed on Aug. 10, 2015 in the Chinese Intellectual Property Office and assigned Serial number 201510488037.8, and of a Chinese patent application filed on Nov. 6, 2015 in the Chinese Intellectual Property Office and assigned Serial number 201510752643.6, the entire disclosure of each of which is hereby incorporated by reference.

TECHNICAL FIELD

The present disclosure relates to wireless communication technologies. More particularly, the present disclosure relates to a method and apparatus for controlling a wireless local area network (WLAN) bearer.

BACKGROUND

Currently, mobile communication technologies tend to provide high-rate multimedia services increasingly. FIG. 1 is a schematic diagram illustrating a system architecture evolution (SAE) system according to the related art.

In FIG. 1, a user equipment (UE) 101 is a terminal device for receiving data. An evolved universal terrestrial radio access network (E-UTRAN) 102 is a radio access network which includes a base station, e.g. an eNodeB/NodeB for providing a radio network interface for the UE. A mobile management entity (MME) 103 is adapted to manage mobility contexts, session contexts and security information of the UE. A serving gateway (SGW) 104 is adapted to provide functions of a subscriber plane. The MME 103 and the SGW 104 may be in the same physical entity. A packet gateway (PGW) 105 is adapted to implement charging and legal monitoring functions. The PGW 105 and the SGW 104 may be in the same physical entity. A policy and charging rules function (PCRF) 106 is adapted to provide quality of service (QoS) policies and charging rules. A general packet radio service (GPRS) supporting node (SGSN) 108 is a network node device for providing routing for data transmission in a universal mobile telecommunications system (UMTS). A home subscriber server (HSS) 109 is a home sub-system of the UE and is adapted to protect user information including the current location of the UE, the address of a serving node, user security information and packet data contexts of the UE.

In networks of the related art, it is not defined how to select WLAN nodes for offloading UE data under the control of the base station.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for controlling a wireless local area network (WLAN) bearer.

In accordance with an aspect of the present disclosure, a method for controlling a WLAN bearer is provided. The method includes receiving, by a base station, information including at least one of WLAN information of a WLAN node, WLAN aggregation response information, WLAN aggregation update response information, WLAN aggregation update information and a WLAN capability of user equipment (UE), and instructing, by the base station, the UE to perform traffic steering between an evolved universal terrestrial radio access network (E-UTRAN) and the WLAN, or instructing, by the base station, the UE to perform control processing for the EUTRAN and WLAN aggregation, according to the received information.

The WLAN information of the WLAN node may include at least one of a WLAN identifier, a public land mobile network (PLMN) identifier, a supported maximum rate, a basic service set (BSS) load/channel utilization rate, backhaul uplink/downlink available bandwidth, the number of users, user average throughput, WLAN total available capacity, WLAN identifiers of adjacent or nearby WLAN nodes, WLAN quality of service (QoS) information supported by the WLAN node and UE average access delay.

The WLAN QoS information may include whether QoS is supported and/or supported QoS mechanism.

Before the base station receives the information, the method may include sending, by the base station, WLAN aggregation request information or WLAN aggregation update information to a WLAN termination (WT), receiving, by the base station, WLAN aggregation response information or WLAN aggregation update response information from the WT.

The WLAN aggregation request information or WLAN aggregation update information may include at least one of a WLAN identifier of each WLAN node of the WLAN aggregation selected for the UE, an identifier of a registered PLMN of the UE and an identifier of an equivalent PLMN of the registered PLMN, an identifier of the UE, an evolved node B (eNB) Xw UE identifier (ID), information of offload bearer on the base station side, a WLAN capability of the UE, location information of the UE, a WLAN aggregation threshold condition, WLAN measurement information of the UE, and WLAN information of a WLAN node associated with the UE.

The WLAN aggregation response information or the WLAN aggregation update response information may include at least one of WLAN aggregation preparing information, a WT Xw UE ID, information of the offloaded bearer on the WT side, and information of that the UE has established association. When the WLAN aggregation response information may include the WLAN aggregation preparing information, the method further may include sending, by the base station, the WLAN aggregation preparing information to the UE as one item of WLAN aggregation configuration information to establish the WLAN aggregation.

The WLAN aggregation preparing information may include at least one of a node identifier list of the WLAN aggregation, Internet protocol (IP) addresses reserved for the UE, a PLMN identifier, and the identifier of the UE.

Each WLAN node indicated in the node identifier list of the WLAN aggregation may match at least one of a WLAN node within a management scope of the WT of the WLAN aggregation, a WLAN node under the registered PLMN of the UE or the equivalent PLMN of the registered PLMN, a WLAN node with which the UE is allowed to associate or re-associate in the WLAN aggregation, and a WLAN node indicated in a node identifier list of the WLAN aggregation which is selected by the WT for the UE and is obtained by the base station from the WT.

A mode used by the WT to obtain the node identifier list of the WLAN aggregation may include at least one of the WT directly generating or updating the node identifier list of the WLAN aggregation for the UE, the WT receiving the node identifier list of the WLAN aggregation from the base station, the WT selecting a usable WLAN node of the UE from a node identifier list of the WLAN aggregation received from the base station, and generating or updating the node identifier list of the WLAN aggregation for the UE according to the usable WLAN node, the WT generating or updating the node identifier list of the WLAN aggregation according to WLAN measurement information of the UE, the WT generating or updating the node identifier list of the WLAN aggregation according to a WLAN node which satisfies a WLAN aggregation condition and is obtained via measurement of the UE, the WT generating or updating the node identifier list of the WLAN aggregation according to an identifier of a serving PLMN of the UE and/or an identifier of an equivalent PLMN of the serving PLMN, the WT generating or updating the node identifier list of the WLAN aggregation according to the location information of the UE, the WT generating or updating the node identifier list of the WLAN aggregation according to a WLAN capability supported by the UE, the WT generating or updating the node identifier list of the WLAN aggregation according to a WLAN node currently associated with the UE, and the WT generating or updating the node identifier list of the WLAN aggregation according to a WLAN aggregation threshold condition provided by the base station.

The information that the UE has established association may include at least one of an identifier of an associated WLAN node, a WLAN medium access control (MAC) address of the UE, and QoS mapping of an offloaded UE bearer executed by the associated WLAN node.

The information received by the base station may include the WLAN capability of the UE. The WLAN capability of the UE may include at least one of WLAN aggregation capability of the UE, a WLAN on/off state of the UE, a WLAN frequency supported by the UE, a WLAN frequency band supported by the UE, and WLAN QoS information supported by the UE.

After the base station receives the WLAN aggregation update information, the method may include sending, by the base station, the WLAN aggregation update response information to the WT. The WLAN aggregation update information is received by the base station after the UE performs handover or changes an associated WLAN node. After the base station receives the WLAN aggregation update information and before the WT sends the WLAN aggregation update response information, the method may include deciding, by the base station, whether to update a node list of the WLAN aggregation selected for the UE, or whether to offload more bearers, or whether to delete an offloaded bearer, according to a handover result and the WLAN aggregation update information, or according to a changed WLAN node and the WLAN aggregation update information, and instructing the UE to perform control processing for the EUTRAN and WLAN aggregation accordingly. The WLAN aggregation update information may include association information updated by the UE and/or a WLAN aggregation node identifier list selected by the WT for the UE, and the WLAN aggregation update response information may include a WLAN aggregation node identifier list selected by the base station for the UE.

Preferably, the association information updated by the UE may include at least one of WLAN information of an associated WLAN node and WLAN QoS mapping of an offloaded UE bearer executed by the associated WLAN node.

In accordance with an aspect of the present disclosure, a base station for controlling a WLAN bearer includes a receiving unit is provided. The base station is configured to receive information including at least one of WLAN information of a WLAN node, WLAN measurement information, WLAN aggregation response information, WLAN aggregation update response information, WLAN aggregation update information, and a WLAN capability of UE, and a processing unit, configured to instruct the UE to perform traffic steering between an E-UTRAN and the WLAN, or instruct the UE to perform control processing for the EUTRAN and WLAN aggregation, according to the information received by the receiving unit.

In accordance with an aspect of the present disclosure, a UE for controlling a WLAN bearer is provided. The UE includes a receiving unit, configured to receive WLAN aggregation configuration information sent by a base station, and a selecting unit, configured to select a WLAN node according to the WLAN aggregation configuration information to initiate an association/re-association.

As can be seen from the above technical solutions, the base station obtains dynamic and static WLAN information of the WLAN nodes by performing interoperations with the WT and the UE, thereby reducing a large number of workloads caused by manual configurations. According to the configured WLAN aggregation condition and the interoperations with the WT and the UE, when the UE moves between the WLAN nodes, signaling of control and Uu ports of the base station is reduced, continuity of receiving data is maintained for the UE, throughput of the UE is increased, and increasing data communication requirements of the UE are satisfied.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In network structures of the related art, a wireless local area network (WLAN) aggregation method is provided to improve throughput of user equipment (UEs). In the WLAN aggregation, the UE establishes a dual connectivity of a evolved universal terrestrial radio access network (EU-TRAN) bearer and a WLAN bearer, and parts or all of data to be transmitted to the UE are offloaded to the WLAN. The control plane of the UE is still established between the UE and a base station, and the WLAN only offloads data of the user plane of the UE. The base station controls establishment and deletion of the WLAN aggregation. By using the WLAN aggregation method, the UE is configured to utilize the bandwidth of the WLAN, and service continuity of WLAN services is improved.

The UE associating with a WLAN node refers to a connection established between the UE and the WLAN, and data may be transmitted between the UE and the WLAN. The UE re-associating with a WLAN node refers to an association between the UE and a first WLAN node moved to a second WLAN node, or refers to the UE performing handover and accessing the second WLAN node. After the UE re-associates with the second WLAN node, the continuity is still maintained. Generally, the WLAN nodes which are able to be re-associated with the UE belong to the same extended service set (ESS), the same homogeneous ESS (HESS), or the same management scope.

Figure 1:
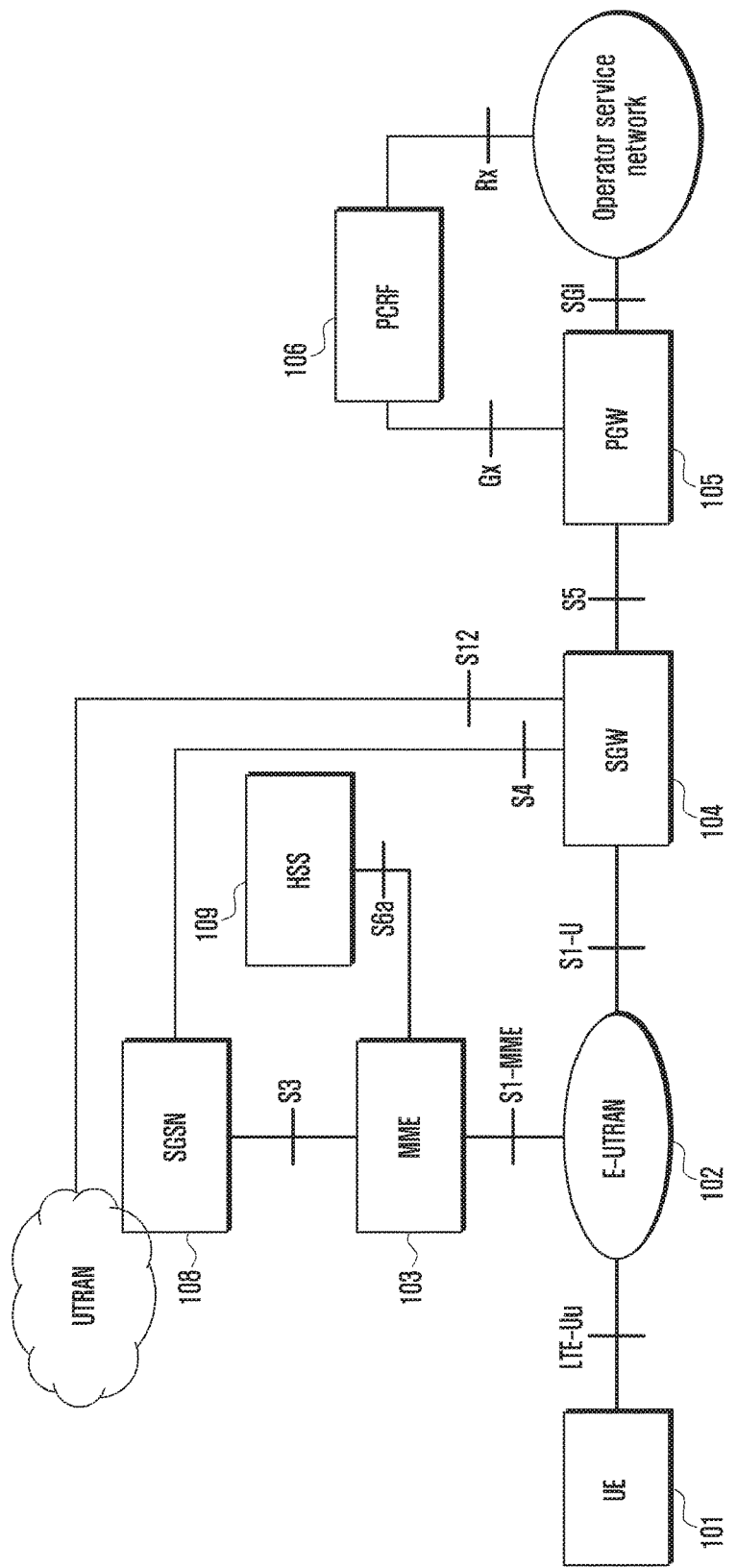
FIG. 1 is a schematic diagram illustrating the structure of an evolved packet system (EPS) system according to the related art.
Figure 2:
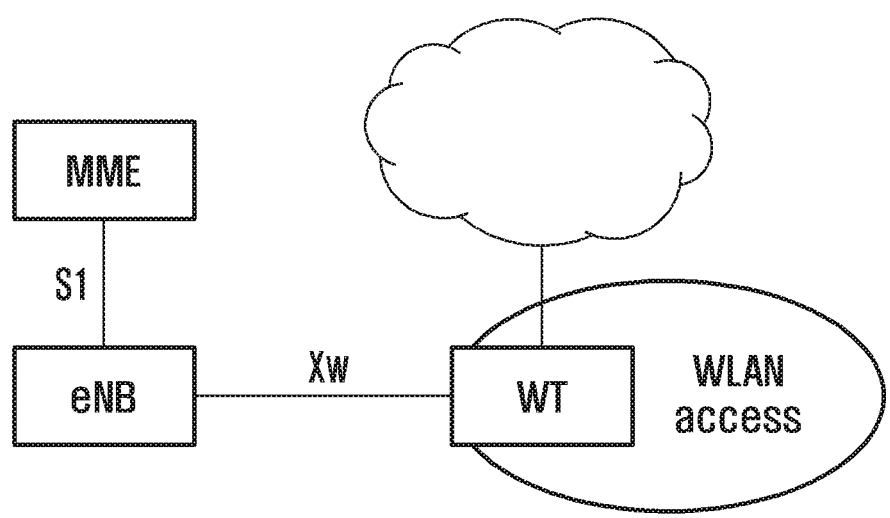
FIG. 2 is a schematic diagram illustrating an interface between a base station and a wireless local area network (WLAN) according to an embodiment of the present disclosure.

FIG. 2 is a schematic diagram illustrating an interface between a base station and a wireless local area network (WLAN) according to an embodiment of the present disclosure.

Referring to FIG. 2, the base station is an eNB, and an interface between the eNB and the WLAN side is an Xw interface, an opposite end of the Xw interface on the eNB is a WLAN termination (WT). The WT may be regarded as an agent of the WLAN side, and influence on the WLAN side may be shielded via the WT. The WT may manage one or more WLAN entities, e.g. an access point (AP), an access controller (AC), a basic service set (BSS), an ESS, an HESS or others. The WT may be a single node or may be merged with the AP, AC, or another WLAN entity.

Currently, the following problems are known.

Problem 1), the coverage of the WLAN node is small. If the UE moves between WLAN nodes, numerous Uu interface loads and Xw interfaces loads may be caused when the base station performs real-time control.

Problem 2), the UE may perform re-association between the WLAN nodes. However, since the WLAN is a Best-effort network, the re-associated WLAN may not satisfy communication requirements of the UE.

For example, the WT manages a ESS, and multiple APs are included. The base station establishes the WLAN aggregation via the WT. The UE needs to select a new AP to initiate the re-association when the UE moves among the APs of the ESS. The re-association between the UE and the AP is transparent for the base station. The data offloaded to the WLAN from different UEs have different quality of service (QoS) requirements. If requirements of the re-association are defined by the UE itself, the selected AP may not satisfy the service QoS requirements.

Problem 3), the coverage of the base station is much larger than that of the WLAN node, and there may be numerous WLANs in the coverage of the base station. The WLAN may be started up or closed down at any moment. If information of the WLAN is obtained via configurations, the workload may be huge. In addition, the base station may manage WLAN networks of other members except an operator of the base station, but the WLAN networks of different members are not distinguished by the base station currently.

Problem 4), the base station may not know the WLAN nodes in the coverage of the base station, or the WLAN node may not know the base station in the coverage of the WLAN node. The WLAN aggregation is the dual connectivity of the UE between the EUTRAN and the WLAN, and may be implemented only when the UE is in an overlap of the coverage of the EUTRAN and the coverage of the WLAN.

Problem 5), the base station may not know the management scope of the WT. The base station controls the WLAN aggregation via the WT, but the base station may not know which WLAN node is usable in the management scope of the WT.

Problem 6), the base station may not know WLAN capability of the UE.

The UE needs to have the WLAN capability, e.g. a WLAN aggregation capability. But the UE may enable or disable the WLAN capability at any moment, i.e. the WLAN capability is dynamic Problem 7), it is not clear how to select a target WLAN node of the WLAN aggregation for the UE.

Problem 8), it is not clear how to control QoS of the offloaded bearer.

In order to make the object, technical solution, and merits of the present disclosure clearer, the present disclosure will be illustrated in detail hereinafter with reference to the accompanying drawings and specific examples.

In examples of the present disclosure, a method for establishing the WLAN bearer includes the following operations.

In a first operation, a base station receives information including at least one of WLAN information of a WLAN node, WLAN aggregation response information, WLAN aggregation update response information, WLAN aggregation update information, and a WLAN capability of UE.

In a second operation, according to the received information, the base station instructs the UE to perform traffic steering between an EUTRAN and the WLAN, or instructs the UE to perform control processing for the EUTRAN and WLAN aggregation.

When instructing the UE to perform traffic steering between the EUTRAN and WLAN, the base station may configure radio access network (RAN) assistant information for the UE to instruct the UE to perform traffic steering between the EURTAN and the WLAN. When instructing the UE to perform control processing for the EUTRAN and the WLAN aggregation, the base station may configure WLAN aggregation configuration information for the UE, or configure WLAN measurement for the UE, or the base station may decide whether to establish, modify, or delete the WLAN aggregation.

In the above processing, the base station may configure the RAN assistant information, the WLAN aggregation or the WLAN measurement according to received information of WLAN nodes; or the base station may decide a control operation for the WLAN aggregation according to the received information of the WLAN nodes, and the control operation may include establishing, modifying or deleting the WLAN aggregation, which may be described in detail as follows.

Figure 3:
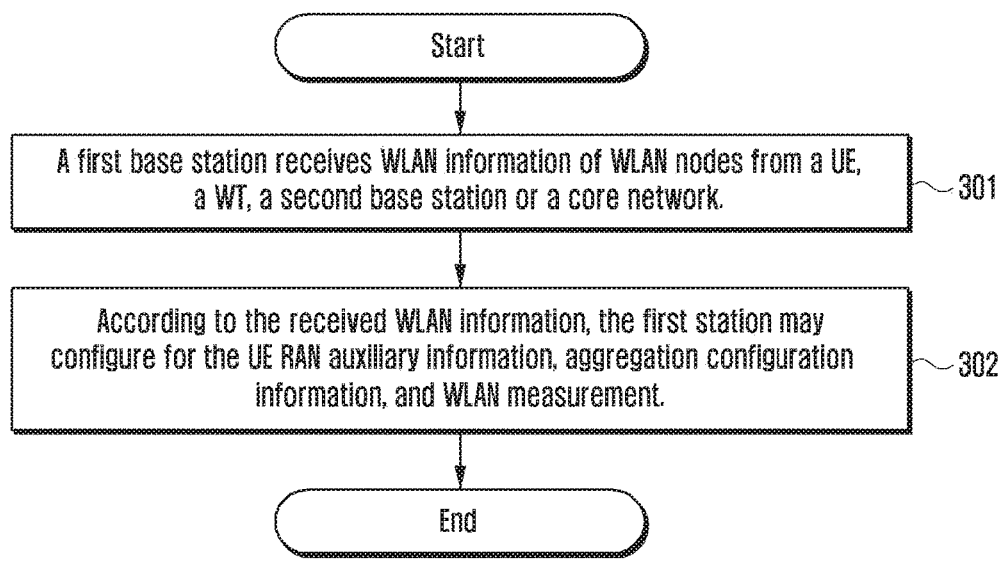
FIG. 3 is a flowchart illustrating a method for controlling a WLAN bearer according to various embodiments of the present disclosure.

FIG. 3 is a flowchart illustrating a method for controlling a WLAN bearer according to various embodiments of the present disclosure. In the method, according to WLAN information of WLAN nodes, a base station configures RAN assistant information, WLAN aggregation or WLAN measurement. The method includes the following operations.

Referring to FIG. 3, at operation 301, a first base station receives WLAN information of WLAN nodes from a UE, a WT, a second base station, or a core network.

In some examples, the WLAN node may be an AP, an AC, a WT, a BSS, an ESS, an HESS, or another WLAN node or unit.

In some examples, the WLAN information of the WLAN node includes at least one of a WLAN identifier, a PLMN identifier, a supported maximum rate, a BSS load/Channel utilization rate, backhaul uplink/downlink available bandwidth, a number of users, user average throughput, WLAN total available capacity, UE average access delay, WLAN identifiers of adjacent or nearby WLAN nodes, and WLAN QoS information supported by the WLAN node.

In some examples, the adjacent WLAN node refers to a WLAN node having an adjacent location or an adjacent coverage. The nearby WLAN node refers to a WLAN node which is not a neighbor of the WLAN node but has a near location or a near coverage, e.g., an adjacent node of the adjacent WLAN node, or when the distance between the location or coverage of a certain WLAN node and of the WLAN node is less than or equal to a preset distance, the certain WLAN node is the nearby WLAN node of the WLAN node. In some examples, the base station may configure WLAN nodes of the WLAN aggregation for the UE, and the configured WLAN nodes of the WLAN aggregation may include a WLAN node of the UE, adjacent or nearby WLAN nodes of the WLAN node of the UE, a measured WLAN node, and adjacent or nearby WLAN nodes of the measured WLAN node.

In some examples, the supported WLAN QoS information includes at least one of whether QoS is supported and supported QoS mechanism (e.g. enhanced distributed channel access in which data are transmitted according to different user priorities, and Hybrid Coordination Function, etc.). In some examples, the selectable WLAN aggregation nodes configured by the base station for the UE may include only WLAN nodes supporting WLAN QoS schedule.

In some examples, the WLAN identifier is an identifier of a WLAN node and includes at least one of a service set identifier (SSID), a BSS ID, and an HESS ID.

In some examples, the PLMN identifier is an identifier of a PLMN to which the WLAN node belongs or an identifier of a PLMN of an operator to which the WLAN node belongs.

In some examples, the supported maximum rate is a maximum rate supported by the WLAN.

In some examples, the base station obtains the WLAN information of the WLAN nodes via the UE. The WLAN information of the WLAN nodes may include WLAN information of WLAN nodes measured by the UE, e.g. WLAN information of a WLAN node with which the UE is associating, or WLAN information of a candidate second WLAN node. According to a mapping relation between the WT and the WLAN information of the WLAN nodes which is obtained from the UE, the first station may obtain an Internet protocol (IP) address of the WT, and establish an Xw interface with the WT. Or, before receiving the WLAN information of the WLAN nodes sent by the WT, the base station may obtain the IP address of the WT, and establish the Xw interface with the WT according to the mapping relation between the WLAN information and the WT which is obtained from the UE. In some examples, by using the mapping relation between the WLAN information and the WT which is obtained from the UE, the base station may acquire the IP address of the WT by using the WLAN information obtained from the UE.

In some examples, the first base station obtains the WLAN information of the WLAN nodes via the WT, e.g., WLAN information of each WLAN node in the managing scope of the WT, WLAN information of each WLAN node under different PLMN in the managing scope of the WT, or WLAN information of a WLAN node with which the UE is associating/re-associating in the managing scope of the WT.

In some examples, the base station obtains the WLAN information of the WLAN nodes via UE measurement and cooperation of the WT. In some examples, according to WLAN identifiers of WLAN nodes included in measurement reports received from the UE, the base station may associate WLAN information of WLAN nodes obtained from the WT, so as to determine whether the WLAN nodes reported by the UE belong to WLAN nodes under the registered PLMN of the UE or under the equivalent PLMN of the registered PLMN, determine a WT whose management scope covers the WLAN nodes reported by the UE, and determine whether re-association may be performed, etc.

At operation 302, according to the received WLAN information of the WLAN nodes, the first station may configure for the UE: 1) RAN assistant information for instructing traffic steering between the EUTRAN and the WLAN; 2) aggregation configuration information of the UE on the EUTRAN and the WLAN; and 3) WLAN measurement.

For example, the base station may select a WT of the WLAN aggregation or configure the RAN assistant information according to WLAN load information, so that the UE will not access a WLAN node having a high load.

For example, the base station may instruct the UE to measure and report only the WLAN nodes within the coverage of the base station, thereby reducing measurement of invalid WLANs.

Figure 4:
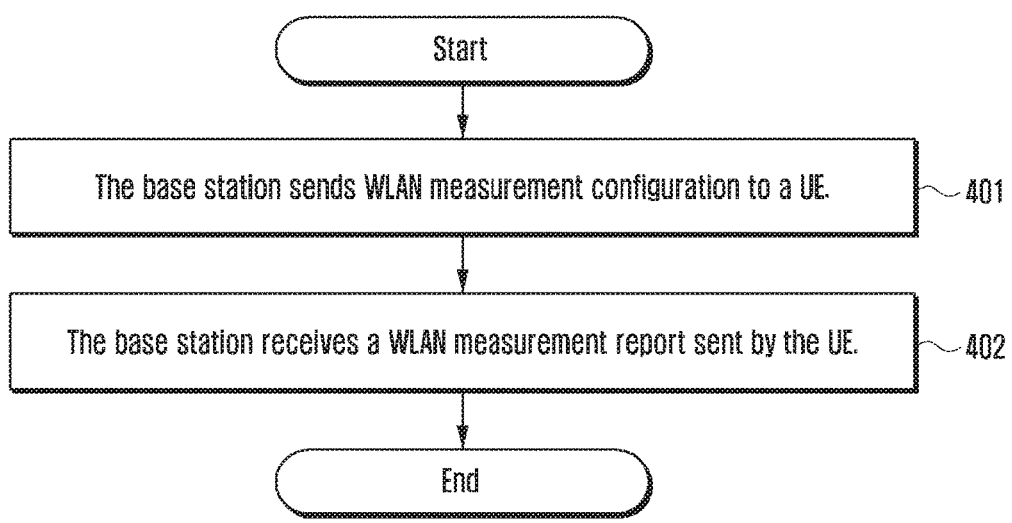
FIG. 4 is a flowchart illustrating a method for controlling a WLAN bearer according to various embodiments of the present disclosure.

FIG. 4 is a flowchart illustrating a method for controlling a WLAN bearer according to various embodiments of the present disclosure. In the method, information received by a base station includes WLAN measurement information, and modes for receiving the WLAN measurement information by the base station are described. The method includes the following operations.

Referring to FIG. 4, at operation 401, the base station sends WLAN measurement configuration to a UE.

The WLAN measurement configuration includes at least one of a WLAN identifier, measuring time, measurement reporting threshold, parameters to be measured, and measurement reporting time. The WLAN identifier is described at operation 301, and will not be described again herein.

In some examples, the parameters to be measured include at least one of a WLAN identifier, a PLMN identifier, a supported maximum rate, a BSS load/Channel utilization rate, backhaul uplink/downlink available bandwidth, a number of users, user average throughput, a WLAN total available capacity, UE average access delay, a WLAN frequency, and a WLAN frequency band (for example, a country code, an operation type, or a WLAN frequency band identifier consisting of WLAN channel identifiers).

In some examples, the measurement reporting threshold includes at least one of a threshold of the BSS load/Channel utilization rate, a threshold of the backhaul uplink/downlink available bandwidth, a threshold of received signal strength indication (RSSI) of Beacon, a threshold of the UE average access delay, a threshold of the number of users, a threshold of the user average throughput, a threshold of the WLAN total available capacity. In some examples, when the WLAN information of the WLAN node measured by the UE satisfies the measurement reporting threshold, the UE reports WLAN measurement information to the base station.

In some examples, the measurement reporting threshold is satisfied when WLAN information of a candidate target WLAN node of the WLAN aggregation satisfies a WLAN aggregation threshold condition.

The WLAN information of the WLAN node satisfying the WLAN aggregation threshold condition will be described at operation 702 and will not be described herein.

In some examples, the candidate target WLAN node of the WLAN aggregation matches at least one of: a WLAN node under a registered PLMN of the UE or an equivalent PLMN of the registered PLMN, a WLAN node within a management scope of a certain WT to which the base station may connect, a WLAN node not within a management scope of the WT of the current WLAN aggregation of the UE, a WLAN node not included in a WLAN aggregation node identifier list instructed by the base station, and a WLAN node with which the UE cannot associate or re-associate.

In some examples, the measurement reporting threshold is not satisfied when the current WLAN aggregation of the UE does not include the WLAN node whose WLAN information satisfies the WLAN aggregation threshold condition.

The WLAN information of the WLAN node not satisfying the WLAN aggregation threshold condition will be described at operation 702 and will not be described here.

In some examples, the WLAN node in the current WLAN aggregation of the UE matches at least one of a WLAN node under the registered PLMN of the UE or the equivalent PLMN of the registered PLMN, a WLAN node within a management scope of the WT of the current WLAN aggregation of the UE, a WLAN node included in a WLAN aggregation node identifier list instructed by the base station, and a WLAN node with which the UE can associate or re-associate.

In some examples, the measurement reporting time is a time period. When the time period arrives, the UE reports the WLAN measurement information to the base station. After receiving the WLAN measurement configuration from the base station, the UE configures WLAN nodes to be measured, information to be measured, time to perform the measurement, performs the measurement, and reports WLAN measurement information.

At operation 402, the base station receives the WLAN measurement information sent by the UE.

The WLAN measurement information is the WLAN information of the WLAN nodes measured by the UE. The WLAN information of the WLAN node is described at operation 301 and will not be described again here.

In some examples, according to the WLAN measurement information sent by the UE, the base station may decide whether to establish, modify, or delete the WLAN aggregation of the UE, or may perform WLAN aggregation configuration for the UE.

In some examples, the WLAN measurement information received by the base station indicates identifiers of WLAN nodes. The base station may directly obtain WLAN information of measured WLAN nodes from the WLAN measurement information, or the base station may obtain the WLAN information of the measured WLAN nodes from WLAN information obtained by an associated WT.

In some examples, the base station learns that the WLAN information of the candidate target WLAN node of the WLAN aggregation satisfies the WLAN aggregation threshold condition. If the UE does not establish the WLAN aggregation, the base station may establish the WLAN aggregation for the UE. The WLAN information of the candidate target WLAN node satisfying the WLAN aggregation threshold condition is described at operation 401 and will not be described again here.

In some examples, the base station learns that the current WLAN aggregation of the UE does not include the WLAN node whose WLAN information satisfies the WLAN aggregation threshold condition. The base station may delete the WLAN aggregation of the current WT and/or delete the WLAN aggregation of the UE. The current WLAN aggregation of the UE not including the WLAN node whose WLAN information satisfies the WLAN aggregation threshold condition is described at operation 401 and will not be described again here.

In some examples, when the base station learns that the current WLAN aggregation of the UE does not include the WLAN node whose WLAN information satisfies the WLAN aggregation threshold condition and that there is a candidate target WLAN node of the WLAN aggregation whose WLAN information satisfies the WLAN aggregation threshold condition, the base station may delete the WLAN aggregation of the current WT and re-select a WT for the UE to establish the WLAN aggregation, and send modified WLAN aggregation configuration information to the UE.

The current WLAN aggregation of the UE not including the WLAN node whose WLAN information satisfies the WLAN aggregation threshold condition and the candidate target WLAN node of the WLAN aggregation whose WLAN information satisfies the WLAN aggregation threshold condition are described at operation 401 and will not be described again here.

The WLAN aggregation configuration information will be described at operation 701 and will not be described again here.

Figure 5:
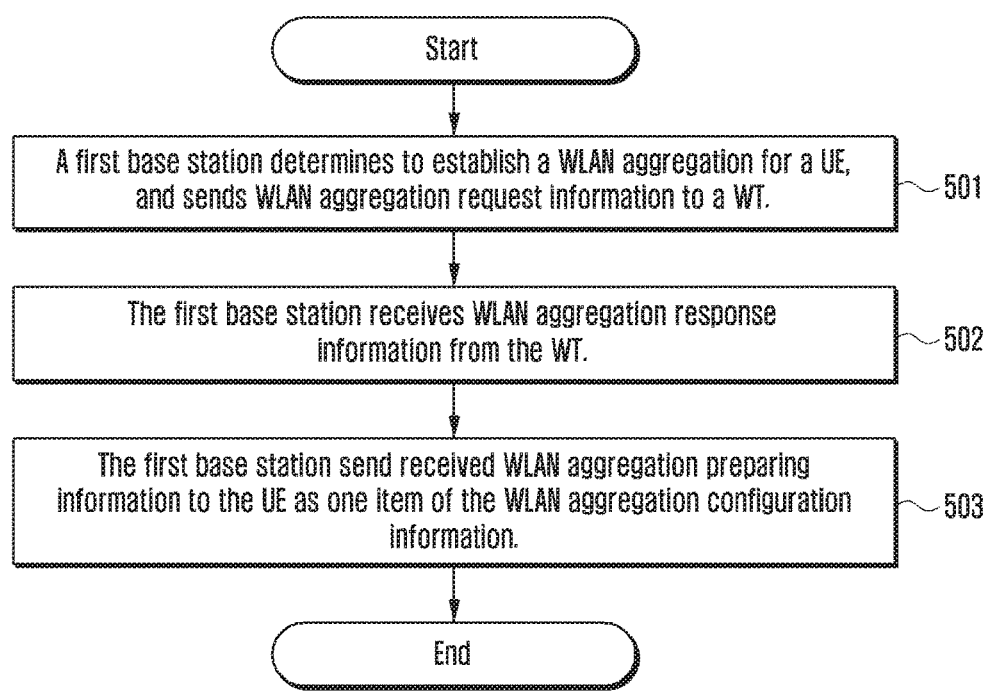
FIG. 5 is a flowchart illustrating a method for controlling a WLAN bearer according to various embodiments of the present disclosure.

FIG. 5 is a flowchart illustrating a method for controlling a WLAN bearer according to various embodiments of the present disclosure. The method refers to a procedure of receiving WLAN aggregation response information or WLAN aggregation update response information by a base station. The method includes the following operations.

Referring to FIG. 5, at operation 501, a first base station determines to establish a WLAN aggregation for a UE, and sends WLAN aggregation request information or WLAN aggregation update information to a WT.

The WLAN aggregation request information or WLAN aggregation update information may include at least one of a WLAN identifier of each WLAN node of the WLAN aggregation selected for the UE, an identifier of a registered PLMN of the UE and an identifier of an equivalent PLMN of the registered PLMN, an identifier of the UE, an eNB Xw UE ID, information of offloaded bearer on the base station side; a WLAN capability of the UE, location information of the UE, a WLAN aggregation threshold condition, WLAN measurement information of the UE, and WLAN information of a WLAN node associated with the UE.

In some examples, the WLAN node of the WLAN aggregation selected for the UE may include at least one of a WLAN node whose WLAN information satisfies a WLAN aggregation condition and/or an adjacent WLAN node or a nearby WLAN node of this WLAN node. In some examples, the base station receives the WLAN measurement information reported by the UE, and determines the WLAN nodes whose WLAN information satisfies the WLAN aggregation condition according to the WLAN measurement information. The WLAN information of the WLAN node satisfying the WLAN aggregation condition will be described at operation 702 and will not be described again here. The WLAN measurement information is described at operation 402, and will not be described again here. In some examples, the WT may select a node identifier list of the WLAN aggregation for the UE according to the WLAN measurement information.

The base station directly selects a node identifier list of the WLAN aggregation for the UE. In some examples, the UE may perform handover (e.g. association, re-association) between WLAN nodes in the node identifier list selected by the base station without informing the base station.

In some examples, the identifier of the UE may be at least one of a WLAN medium access control (MAC) address, an international mobile subscriber identification number (IMSI), a SAE-temporary mobile subscriber identity (S-TMSI), a TMSI, a UE identifier assigned by the base station side for the WLAN aggregation, a C-radio network temporary identifier (C-RNTI), and a UE identifier assigned by the WT side for the WLAN aggregation.

In some examples, information of offloaded bearer on the base station side includes at least one of a WT Xw UE ID, a general packet radio service (GPRS) tunnel protocol (GTP) tunnel endpoint ID (TEID) and an IP address of the offloaded bearer on the base station side, and QoS requirements of the offloaded bearer.

In some examples, the WLAN capability of the UE includes at least one of WLAN aggregation capability of the UE, a WLAN on/off state of the UE, a WLAN frequency supported by the UE, a WLAN frequency band supported by the UE (for example, a country code, an operation type, or a WLAN frequency band identifier consisting of WLAN channel identifiers), and WLAN QoS information supported by the UE. In some examples, the WLAN QoS information supported by the UE includes at least one of whether QoS is supported and a supported QoS mechanism (e.g. enhanced distributed channel access and Hybrid Coordination Function etc.).

In some examples, the location information of the UE includes at least one of an identifier of a cell of the UE, an identifier of a tracking area of the UE (e.g. tracking area code (TAC), tracking area identity (TAI)), an identifier of a service area of the UE (e.g. service area identity (SAI)), and an identifier of a base station of the UE.

The WLAN aggregation threshold condition will be described at operation 701 and will not be described again here.

The WLAN measurement information of the UE is described at operation 402, and will not be described again here.

In some examples, the WLAN node associated by the UE may be a preferred WLAN node of the user. The WLAN information of the WLAN node is described at operation 301 and will not be described again here.

At operation 502, the first base station receives WLAN aggregation response information or WLAN aggregation update response information from the WT.

If the first base station sends the WLAN aggregation request information at operation 501, the WLAN aggregation response information is received by the first base station at operation 502. If first base station sends the WLAN aggregation update information at operation 501, the WLAN aggregation update response information is received by the first base station at operation 502.

The WLAN aggregation response information or the WLAN aggregation update response information includes at least one of WLAN aggregation preparing information, a WT Xw UE ID, information of the offloaded bearer on the WT side, information of that the UE has established association.

In some examples, the information of the offloaded bearer on the WT side includes at least one of a TEID and IP address of the offloaded bearer on the WT side, and QoS requirements of the offloaded bearer.

In some examples, the QoS requirements of the offloaded bearer may be a WLAN QoS mapping result of the offloaded UE bearer executed by the WT. The WLAN QoS mapping result may include at least one of whether QoS is supported, a WLAN access category mapped to the bearer, and WLAN user priorities mapped to the bearer.

In some examples, the WLAN aggregation preparing information includes at least one of a node identifier list of the WLAN aggregation, IP addresses reserved for the UE, a PLMN identifier, and an identifier of the UE.

The identifier of the UE is described at operation 501 and will not be described again here.

In some examples, the WLAN node indicated in the node identifier list of the WLAN aggregation matches at least one of a WLAN node within a management scope of the WT of the WLAN aggregation, a WLAN node under the registered PLMN of the UE or the equivalent PLMN of the registered PLMN, and a WLAN node with which the UE is allowed to associate or re-associate in the WLAN aggregation.

In some examples, the WT may obtain the WLAN aggregation node identifier list via at least one of the following modes.

The WT may directly select or update the WLAN aggregation node identifier list for the UE.

The WT may receive the WLAN aggregation node identifier list from the base station.

The WT may determine whether WLAN nodes in a WLAN aggregation node identifier list received from the base station are usable for the UE, and return the WLAN aggregation node identifier list including determined usable WLAN nodes.

The WT may select or update the WLAN aggregation node identifier list for the UE according to at least one item of the following information:

The WLAN measurement information of the UE, which is described at operation 402 and will not be described again here and the WLAN information of the WLAN nodes measured by the UE. In some examples, according to the WLAN measurement information of the UE, the WT selects the WLAN node whose WLAN information satisfies the WLAN aggregation condition and/or adjacent WLAN nodes or nearby WLAN nodes of this WLAN node.

The WLAN nodes which satisfy a WLAN aggregation condition and are obtained via measurement of the UE. The WLAN node satisfying the WLAN aggregation condition is described at operation 702 and will not be described again here. In some examples, the WT selects the WLAN node whose WLAN information satisfies the WLAN aggregation condition and/or adjacent WLAN nodes or nearby WLAN nodes of this WLAN node, according to the measurement of the UE.

A serving PLMN identifier of the UE and/or an identifier of an equivalent PLMN of the serving PLMN. In some examples, according to the serving PLMN identifier of the UE and/or the identifier of the equivalent PLMN of the serving PLMN, the WT selects WLAN nodes in the PLMN scope and/or adjacent or nearby WLAN nodes of these WLAN nodes. For example, the WT may select WLAN nodes of a WLAN channel supporting the corresponding country and operating type according to the PLMN of the UE.

The location of the UE which may at least one of a tracking area identifier (e.g. TAC or TAI), a service area identifier, a cell identifier and a base station identifier. In some examples, the WT may select WLAN nodes within the coverage of the tracking area, the service area, the cell or the base station of the UE and/or adjacent or nearby WLAN nodes of these nodes.

The WLAN capability supported by the UE. In some examples, according to the WLAN capability supported by the UE, the WT may select WLAN nodes satisfying the WLAN capability supported by the UE and/or adjacent or nearby WLAN nodes of these WLAN nodes. The WLAN capability supported by the UE is described at operation 501. In some examples, the WT may select the WLAN nodes supporting the WLAN frequency, the WLAN frequency band or the WLAN channel number supported by the UE. In some examples, according to the WLAN QoS supported by the UE, the WT may select WLAN nodes supporting the same WLAN QoS.

A WLAN node associated with the UE currently. In some examples, the WT may select the WLAN node associated with the UE currently and/or an adjacent WLAN node of the WLAN node or a WLAN node near to the WLAN node.

A WLAN aggregation threshold condition, which is described at operation 701 and will not be described again here. In some examples, according to the WLAN aggregation threshold condition provided by the base station, the WT may select WLAN nodes matching the WLAN aggregation threshold condition and/or adjacent or nearby WLAN nodes of these WLAN nodes.

In some examples, information that the UE has established association includes at least one an identifier of an associated WLAN node, the identifier of the UE, and a QoS mapping of offloaded UE bearer executed by the associated WLAN node. The QoS mapping of the offloaded UE bearer executed by the associated WLAN node includes at least one of whether WLAN QoS is supported and a WLAN access type mapping to the bearer, a WLAN user priority mapping to the bearer. In some examples, only when the UE associates with the WLAN node indicated in the WLAN aggregation node identifier list, the WT returns information that the UE has established association to the base station. The identifier of the UE is described at operation 501 and will not be described again here. In some examples, the base station directly sends downlink data to the WT after learning that the UE has established association in the WT of the WLAN aggregation.

At operation 503, when the WLAN aggregation preparing information is included in the received WLAN aggregation response information or the WLAN aggregation update response information, the first base station may send the received WLAN aggregation preparing information to the UE as one item of the WLAN aggregation configuration information, or the first base station may directly configure the WLAN aggregation configuration information of the UE after determining that the WT is ready.

The WLAN aggregation configuration information will be described at operation 701 and will not be described again here.

Figure 6:
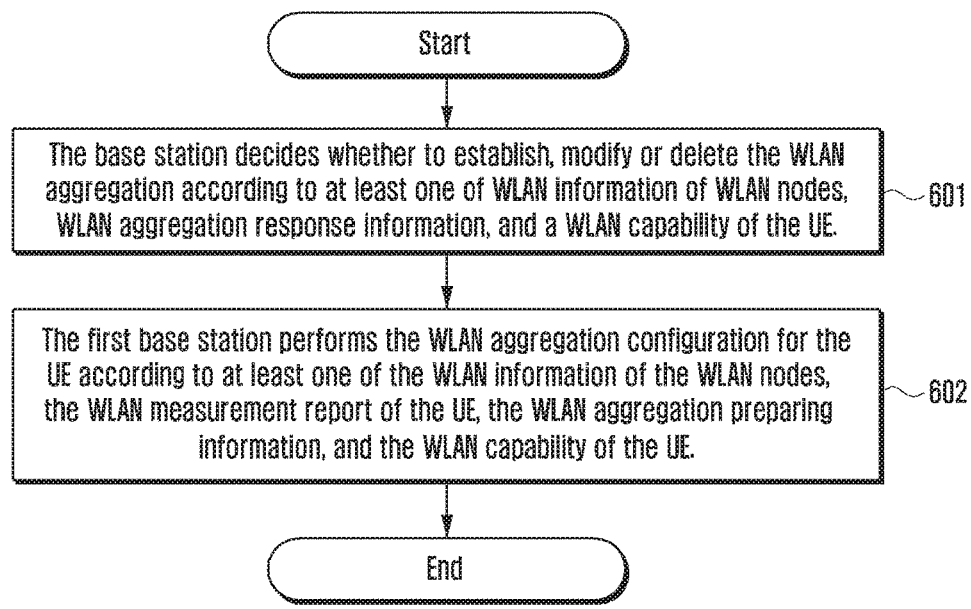
FIG. 6 is a flowchart illustrating a method for controlling a WLAN bearer according to various embodiments of the present disclosure.

FIG. 6 is a flowchart illustrating a method for controlling a WLAN bearer according to various embodiments of the present disclosure. In the method, a base station decides control for WLAN aggregation according to received information. The method includes the following operations.

Referring to FIG. 6, at operation 601, the base station decides whether to establish, modify, or delete the WLAN aggregation according at least one of WLAN information of WLAN nodes, WLAN aggregation response information, and a WLAN capability of the UE.

The WLAN information of the WLAN nodes is described at operation 301 and will not be described again here.

The WLAN aggregation response information is described at operation 501 and will not be described again here.

The WLAN capability of the UE includes at least one of a WLAN aggregation capability of the UE, a WLAN on/off state of the UE, a WLAN frequency supported by the UE, a WLAN frequency band supported by the UE (for example, a country code, an operation type, or a WLAN frequency band identifier consisting of WLAN channel identifiers), and WLAN QoS information supported by the UE. In some examples, the WLAN QoS information supported by the UE includes at least one of whether QoS is supported and a supported QoS mechanism (e.g. enhanced distributed channel access and Hybrid Coordination Function etc.). The base station may obtain the WLAN capability of the UE from the UE side. In some examples, the WLAN on/off state of the UE indicates the WLAN of the UE is on or off currently. In some examples, after the WLAN on/off state of the UE changes, the base station may receive the updated WLAN on/off state from the UE.

At operation 602, the first base station performs the WLAN aggregation configuration for the UE according to at least one of the WLAN information of the WLAN nodes, the WLAN aggregation response information, and the WLAN capability of the UE.

The WLAN information of the WLAN nodes is described at operation 301 and will not be described again here.

The WLAN aggregation response information is described at operation 501 and will not be described again here.

The WLAN capability of the UE is described at operation 601 and will not be described again here.

Figure 7:
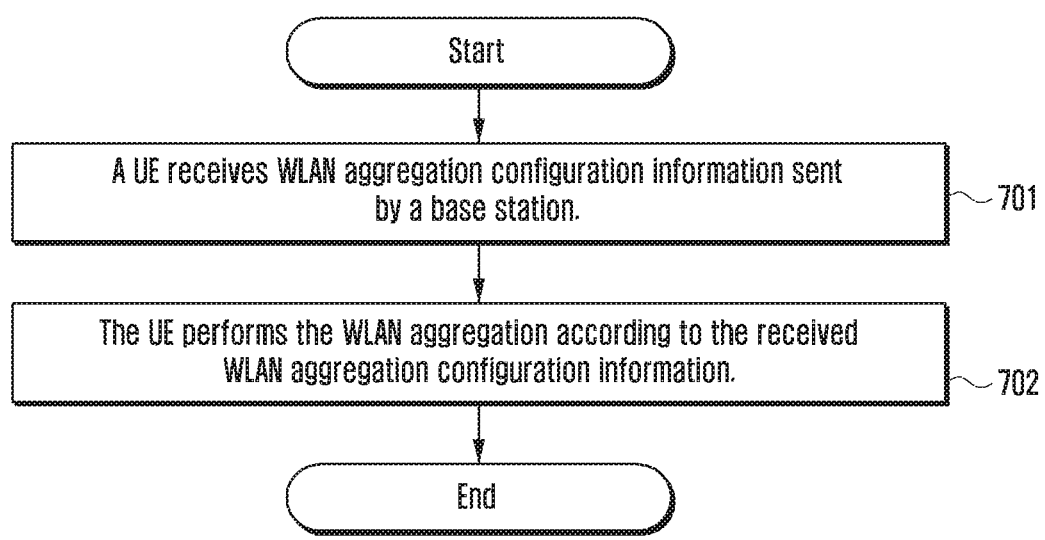
FIG. 7 is a flowchart illustrating a method for controlling a WLAN bearer according to various embodiments of the present disclosure.

FIG. 7 is a flowchart illustrating a method for controlling a WLAN bearer according to various embodiments of the present disclosure. The method involves processing on the UE side. The method includes the following operations.

Referring to FIG. 7, at operation 701, a UE receives WLAN aggregation configuration information sent or updated by a base station.

In some examples, the WLAN aggregation configuration information includes at least one of a PLMN identifier, a WLAN aggregation node identifier list, a WLAN aggregation threshold condition/WLAN aggregation handover threshold condition, and associating/re-associating determining time. The WLAN identifier is described at operation 301 and will not be described again here.

In some examples, the WLAN aggregation node identifier list includes WLAN identifiers of WLAN nodes selected for the UE to perform the WLAN aggregation currently or WLAN identifiers of WLAN nodes with which the UE may perform association/re-association itself. In some examples, the UE performing association/re-association itself refers to, when the WLAN aggregation condition is satisfied, according to the WLAN aggregation threshold condition provided by the base station, the UE itself may select a second WLAN node to perform association/re-association, rather than under the control of the base station.

In some examples, the WLAN node indicated in the WLAN aggregation node identifier list matches at least one of a WLAN node within a management scope of the WT of the WLAN aggregation, a WLAN node under the registered PLMN of the UE or the equivalent PLMN of the registered PLMN, a WLAN node with which the UE is allowed to associate or re-associate in the WLAN aggregation, and a WLAN node indicated in a WLAN aggregation node identifier list which is selected or updated by the WT for the UE and is obtained by the base station from the WT. In some examples, when the base station receives the WLAN aggregation node identifier list selected or updated by the WT for the UE, the base station sends the received WLAN aggregation node identifier list to the UE.

In some examples, the WLAN aggregation threshold condition refers to a determining condition of WLAN nodes with which the UE can associate/re-associate. The WLAN aggregation threshold condition may include at least one of a threshold of a BSS load/Channel utilization rate, a threshold of backhaul uplink/downlink available bandwidth, a threshold of RSSI of Beacon, a threshold of UE average access delay, a threshold of user average throughput, and a threshold of WLAN total available capacity. According to the above thresholds, the UE may determine whether to associate/re-associate with a certain WLAN node. In some examples, any one of the above thresholds may include a low threshold value and a high threshold value, or include a threshold value and a viscosity value. The high threshold value is obtained by adding the viscosity value to the threshold value, and low threshold value is obtained by subtracting the viscosity value from the threshold value.

In some examples, when the associating/re-associating determining time arrives, the UE needs to decide whether to perform an association/re-association according to the WLAN aggregation threshold condition. In some examples, the associating/re-associating determining time may include an initial offset and a period of time. In some examples, the time may be represented by using a frame number and sub-frame number.

At operation 702, the UE selects a WLAN node according to the received WLAN aggregation configuration information and initiates an association/re-association.

In some examples, the UE receives the WLAN aggregation threshold condition. The WLAN aggregation threshold condition is described at operation 701 and will not be described herein.

In some examples, when a first WLAN node associated with the UE currently does not satisfy the WLAN aggregation threshold condition or when a second WLAN node indicated in the WLAN aggregation node identifier list satisfies the WLAN aggregation threshold condition, the UE may select the second WLAN node to initiate the association/re-association. The WLAN aggregation node identifier list is described at operation 701.

In some examples, when the WLAN information of the WLAN node does not satisfy the WLAN aggregation threshold condition, it means that the WLAN information of the WLAN node satisfies at least one of a BSS load/Channel utilization rate is larger than the threshold of the BSS load/Channel utilization rate, a backhaul uplink/downlink available bandwidth is less than the threshold of the backhaul uplink/downlink available bandwidth, an RSSI of Beacon is less than the threshold of the RSSI of Beacon, a UE average access delay is larger than the threshold of the UE average access delay, the number of the users is larger than the threshold of the number of the users, a user average throughput is larger than the threshold of the user average throughput, and a WLAN total available capacity is less than the threshold of the WLAN total available capacity.

In some examples, when the WLAN information of the first WLAN node is equal to at least one the above thresholds, it may be determined that the first WLAN node does not satisfy the WLAN aggregation threshold condition.

In some examples, when the WLAN information of the WLAN node satisfies the WLAN aggregation threshold condition, it means that the WLAN information of the WLAN node satisfies at least one of, a BSS load/Channel utilization rate is less than the threshold of the BSS load/Channel utilization rate, a backhaul uplink/downlink available bandwidth is larger than the threshold of the backhaul uplink/downlink available bandwidth, an RSSI of Beacon is larger than the threshold of the RSSI of Beacon, a UE average access delay is less than the threshold of the UE average access delay, the number of the users is less than the threshold of the number of the users, a user average throughput is less than the threshold of the user average throughput, and a WLAN total available capacity is larger than the threshold of the WLAN total available capacity.

In some examples, when the WLAN information of the WLAN node is equal to at least one of the above thresholds, it may be determined that the WLAN node satisfies the WLAN aggregation threshold condition. Besides the fifth method, the above mode for determining whether the WLAN aggregation threshold condition is satisfied may be also applied to the above-mentioned second method shown in FIG. 4.

In some examples, the value of the threshold for determining whether the first WLAN node does not satisfy the WLAN aggregation threshold condition may be different from the value of the threshold for determining whether the second WLAN node satisfies the corresponding WLAN aggregation threshold condition.

In some examples, the WLAN aggregation threshold condition has a high threshold and a low threshold. The high threshold and the low threshold are described at operation 701. The UE may re-associate with the second WLAN node only when the WLAN information of the candidate second WLAN node and the WLAN information of the currently associated first WLAN node match at least one of the following conditions: a BSS load/Channel utilization rate of the first WLAN node is larger than a high threshold of a BSS load/Channel utilization rate, a backhaul uplink/downlink available bandwidth of the first WLAN node is less than a low threshold of backhaul uplink/downlink available bandwidth, a RSSI of Beacon of the first WLAN node is less than a low threshold of RSSI of Beacon, a UE average access delay of the first WLAN node is larger than a high threshold of UE average access delay, the number of the users of the first WLAN node is larger than a high threshold of the number of the users, a user average throughput of the first WLAN node is larger than a high threshold of user average throughput, a WLAN total available capacity of the first WLAN node is less than a low threshold of WLAN total available capacity, a BSS load/Channel utilization rate of the second WLAN node is less than a low threshold of a BSS load/Channel utilization rate, a backhaul uplink/downlink available bandwidth of the second WLAN node is larger than a high threshold of backhaul uplink/downlink available bandwidth, an RSSI of Beacon of the second WLAN node is larger than a high threshold of RSSI of Beacon, a UE average access delay of the second WLAN node is less than a low threshold of UE average access delay, the number of the users of the second WLAN node is less than a low threshold of the number of the users, a user average throughput of the second WLAN node is less than a low threshold of user average throughput, and a WLAN total available capacity of the second WLAN node is larger than a high threshold of WLAN total available capacity.

In some examples, when the WLAN information of the first WLAN node is equal to at least one of the above thresholds, it may be determined that the first WLAN node satisfies the WLAN aggregation threshold condition, and when the WLAN information of the second WLAN node is equal to at least one of the above thresholds, it may be determined that the second WLAN node satisfies the WLAN aggregation threshold condition.

In some examples, when the first WLAN node associated with the UE currently does not satisfy the WLAN aggregation threshold condition and the second WLAN node satisfying the WLAN aggregation threshold condition does not exist, the UE may request the base station to delete the WLAN aggregation.

Figure 8:
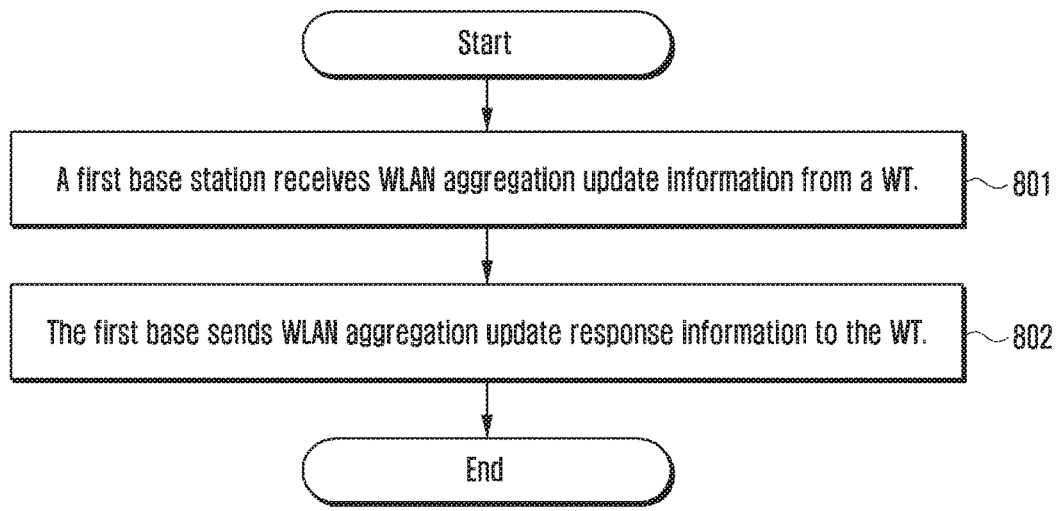
FIG. 8 is a flowchart illustrating a method for controlling a WLAN bearer according to various embodiments of the present disclosure.

FIG. 8 is a flowchart illustrating a method for controlling a WLAN bearer according to various embodiments of the present disclosure. The method involves a procedure of receiving WLAN aggregation update information by a base station and related procedures. The method includes the following operations.

Referring to FIG. 8, at operation 801, a first base station receives WLAN aggregation update information from a WT.

In some examples, the WLAN aggregation update information includes at least one of association information updated by the UE and a WLAN aggregation node identifier list selected for the UE.

In some examples, the association information updated by the UE includes at least one of WLAN information of associated WLAN nodes and WLAN QoS mapping of offloaded UE bearer executed by the associated WLAN node. The WLAN information is described at operation 301 and will not be described again here.

In some examples, when the UE performs handover or changes the associated WLAN node, the WT may perform this operation, sends the WLAN aggregation update information to the first base station. In some examples, the base station may track the WLAN location and resource state according to a handover result or a changed associated WLAN node, and further according to the WLAN aggregation update information, the base station may decide whether to update the WLAN aggregation node identifier list selected for the UE, or whether to offload more bearers, or whether to delete an offloaded bearer.

At operation 802, the first base sends WLAN aggregation update response information to the WT.

In some examples, the WLAN aggregation update response information includes at least one of a WLAN aggregation node identifier list selected for the UE, information of a deleted offloaded bearer, and information of an added offloaded bearer.

The methods of the present disclosure are described via some examples.

Figure 9:
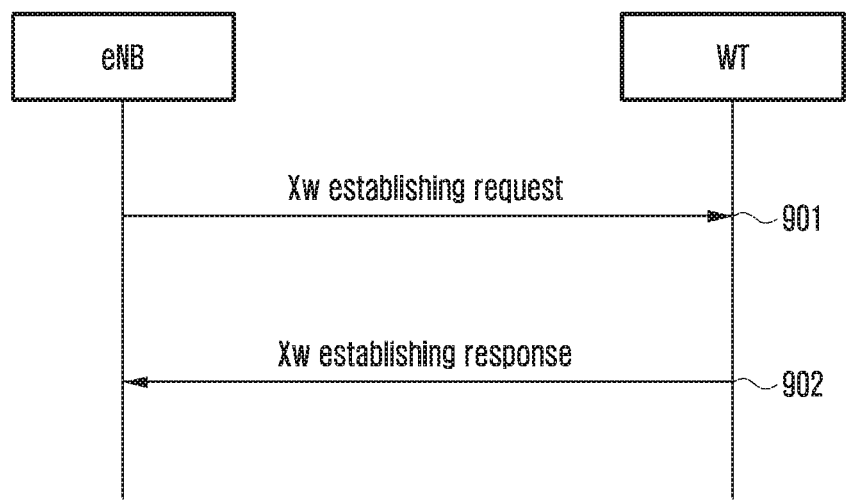
FIG. 9 is a flowchart illustrating a method for controlling a WLAN bearer according to various embodiments of the present disclosure.

FIG. 9 is a flowchart illustrating a method for controlling a WLAN bearer according to various embodiments of the present disclosure. The method includes the following operations.

Referring to FIG. 9, at operation 901, a base station sends an Xw establishing request message to a WT.

In some examples, the base station may determine the WT within the coverage of the base station according to an association relation between the WT and WLAN information of WLAN nodes which is obtained via WLAN measurement and is sent by the UE, and then the base station may request the WT to establish the Xw interface.

At operation 902, the WT sends a Xw establishing response message to the base station. In some examples, the message includes the WLAN information of the WLAN nodes. The WLAN information of the WLAN nodes are described at operation 301 and will not be described again here.

Figure 10:
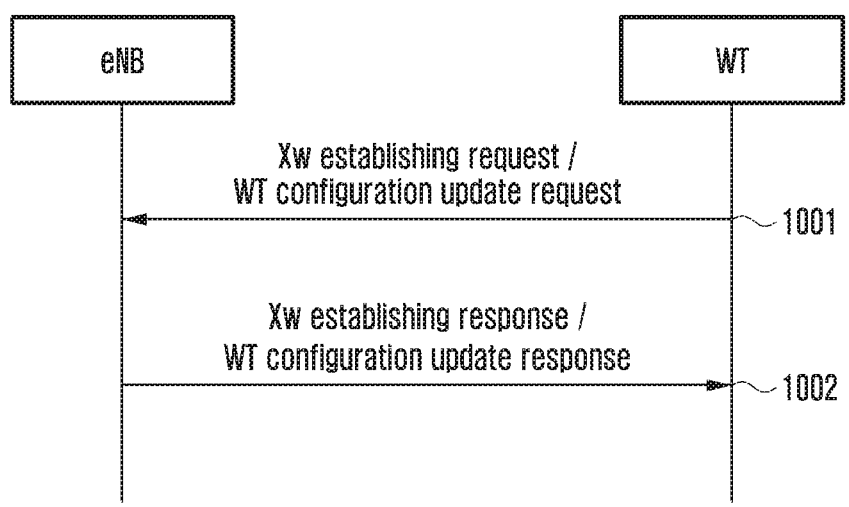
FIG. 10 is a flowchart illustrating a method for controlling a WLAN bearer according to various embodiments of the present disclosure.

FIG. 10 is a flowchart illustrating a method for controlling a WLAN bearer according to various embodiments of the present disclosure. The method includes the following operations.

Referring to FIG. 10, at operation 1001, a WT sends an Xw establishing request message/WT configuration update request message to a base station. In some examples, the message includes WLAN information of WLAN nodes. The WLAN information of the WLAN nodes are described at operation 301 and will not be described again here. In some examples, the WT sends updated WLAN information of the WLAN node to the base station, when the WLAN information of WLAN node belonging to the WT changes, e.g., when a new WLAN node accesses to the WT or an accessed WLAN node is closed. The updated WLAN information of the WLAN nodes includes WLAN information of the new WLAN node, and does not include WLAN information of the closed WLAN node.

At operation 1002, the base station sends an Xw establishing response message/WT configuration update response message to the WT.

Figure 11:
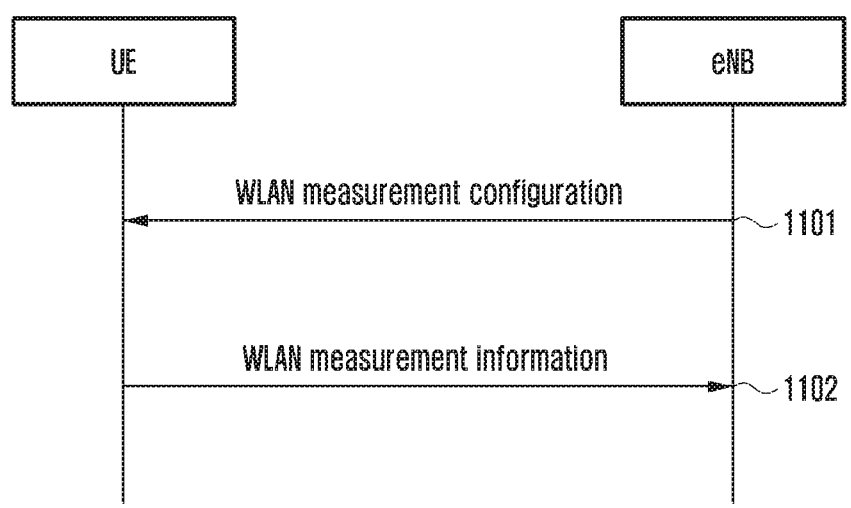
FIG. 11 is a flowchart illustrating a method for controlling a WLAN bearer according to various embodiments of the present disclosure.

FIG. 11 is a flowchart illustrating a method for controlling a WLAN bearer according to various embodiments of the present disclosure. The method includes the following operations.

Referring to FIG. 11, at operation 1101, a base station sends WLAN measurement configuration to a UE. The WLAN measurement configuration is described at operation 401 and will not be described again here.

At operation 1102, the UE sends WLAN measurement information to the base station. The WLAN measurement information is described at operation 402 and will not be described again here.

Figure 12:
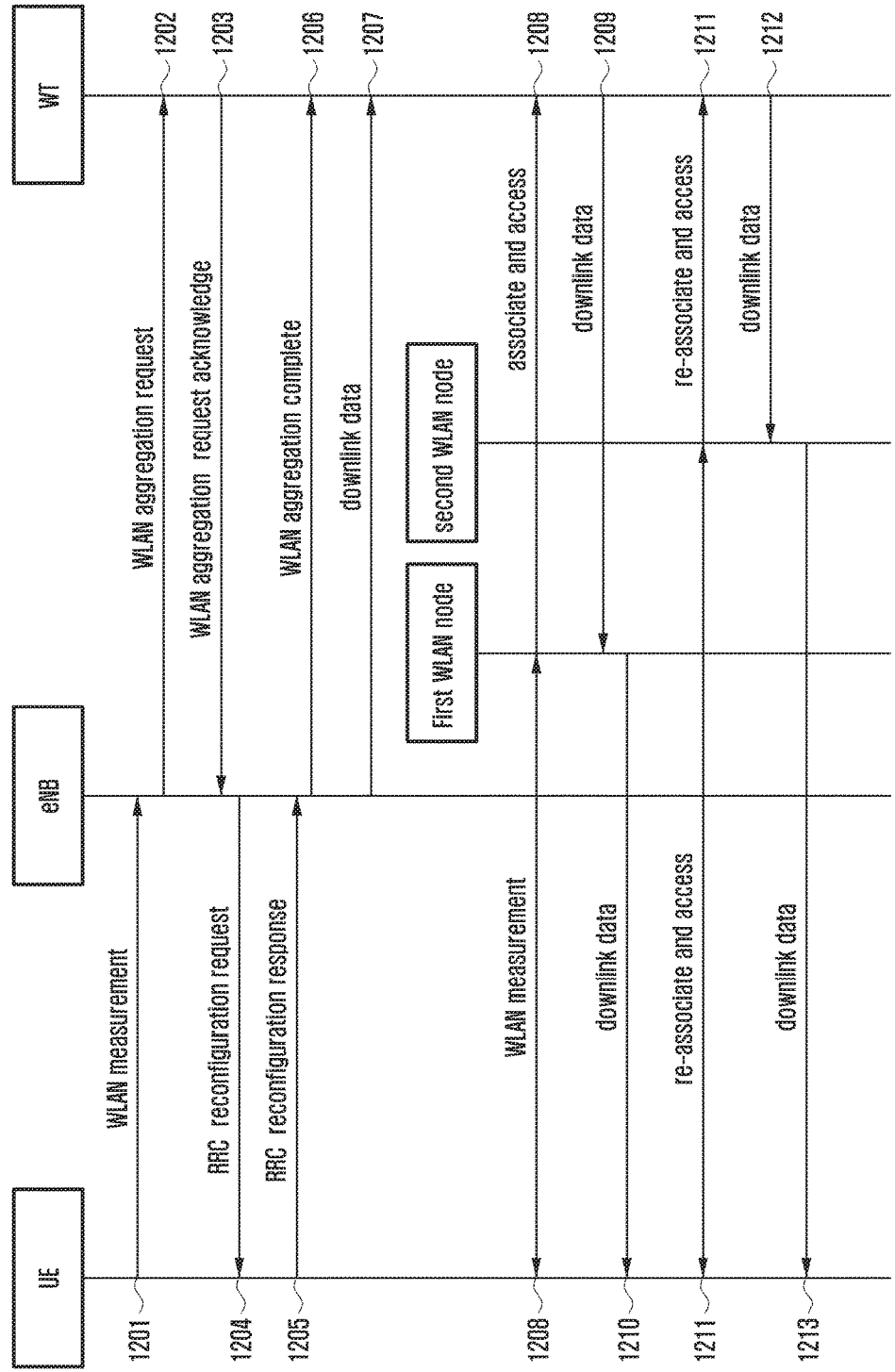
FIG. 12 is a flowchart illustrating a method for controlling a WLAN bearer according to various embodiments of the present disclosure.

FIG. 12 is a flowchart illustrating a method for controlling a WLAN bearer according to various embodiments of the present disclosure. In the method, the above-mentioned third method, fifth method and sixth method are combined. In some examples, a WLAN node and a WT may be merged together. The method includes the following operations.

Referring to FIG. 12, at operation 1201, a base station receives WLAN measurement information from a UE.

At operation 1202, the base station decides to establish WLAN aggregation for the UE according to the WLAN measurement information. The base station selects a WT, and sends a WLAN aggregation establishing request message to the WT. In some examples, the WLAN aggregation establishing request message includes WLAN aggregation request information. The WLAN aggregation request information is described at operation 501 and will not be described again here.

At operation 1203, the base station receives a WLAN aggregation establishing request acknowledgement message from the WT. In some examples, the WLAN aggregation establishing request acknowledgement message indicates WLAN aggregation response information. The WLAN aggregation response information is described at operation 502 and will not be described again here. In some examples, the base station may subsequently receive a WLAN aggregation association acknowledgement message from the WT. In some examples, the WLAN aggregation association acknowledgement message indicates the WLAN aggregation response information. In some examples, the WLAN aggregation association acknowledgement message is used to confirm that the UE has associated with the WALN node.

At operation 1204, the base station sends WLAN aggregation configuration information to the UE via a radio resource control (RRC) reconfiguration request message or a new RRC message. The WLAN aggregation configuration information is described at operation 701 and will not be described again here.

At operation 1205, the UE sends an RRC reconfiguration response message or a new RRC message to indicate that configuration of WLAN aggregation of the UE is complete.

At operation 1206, in some examples, the base station may send a WLAN aggregation complete message to the WT after learning that the configuration of the WLAN configuration of the UE is complete.

At operation 1207, the base station sends downlink data to the WT.

At operation 1208, the UE may access a WLAN node according to association assigned by the base station. Or, the UE may select a WLAN node whose WLAN information satisfies a WLAN aggregation threshold condition from a WLAN aggregation node identifier list assigned by the base station, and perform association with and access the selected WLAN node. The WLAN aggregation node identifier list and the WLAN aggregation threshold condition are described at operation 701 and will not be described again here. The associated WLAN node is called a first WLAN node hereinafter.

At operation 1209, in some examples, the WT forwards the downlink data sent from the base station to the first WLAN node. When the WT is the first WLAN node or the WT is merged with the first WLAN node, the WT may directly send the downlink data to the UE.

At operation 1210, the first WLAN node sends the downlink data to the UE.

At operation 1211, according to the WLAN aggregation configuration information, the UE determines that WLAN information of the first WLAN node does not satisfy the WLAN aggregation threshold condition or WLAN information of a second WLAN node in the WLAN aggregation node identifier list satisfies the WLAN aggregation threshold condition. The WLAN aggregation node identifier list and the WLAN aggregation threshold condition are described at operation 701 and will not be described again here. The UE may associate/re-associate with the second WLAN node and access to the second WLAN node. After the UE associates/re-associates with and accesses the second WLAN node, the WT may send WLAN update information to the base station, as described at operation 801.

At operation 1212, the WT forwards the downlink data sent by the base station to the second WLAN node.

At operation 1213, the second WLAN node sends the downlink data to the UE.

Figure 13:
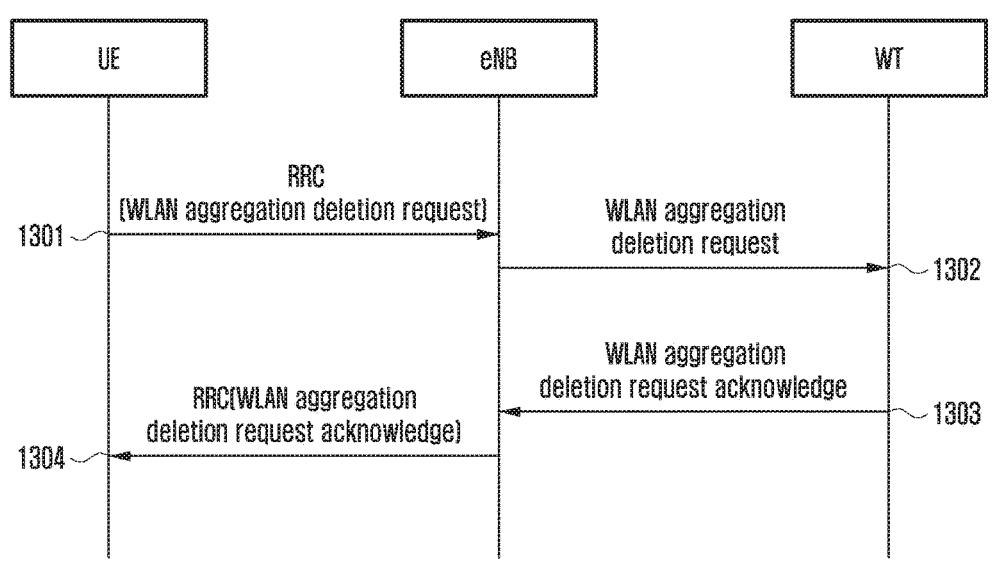
FIG. 13 is a flowchart illustrating a method for controlling a WLAN bearer according to various embodiments of the present disclosure.

FIG. 13 is a flowchart illustrating a method for controlling a WLAN bearer according to various embodiments of the present disclosure. The method includes the following operations.

Referring to FIG. 13, at operation 1301, when the WLAN information of the first WLAN node currently associated with the UE does not satisfy the WLAN aggregation threshold condition and the WLAN aggregation node identifier list does not include the second WLAN node whose WLAN information satisfies the WLAN aggregation threshold condition, the UE may request the base station to delete the WLAN aggregation. The WLAN information of the WLAN node not satisfying the WLAN aggregation threshold condition is described at operation 801 and will not be described again here.

At operation 1302, the base station sends a WLAN aggregation deletion request to the WT of the WLAN aggregation.

At operation 1303, the WT sends a WLAN aggregation deletion acknowledge to the base station.

At operation 1304, the base station sends the WLAN aggregation deletion acknowledge to the UE.

Figure 14:
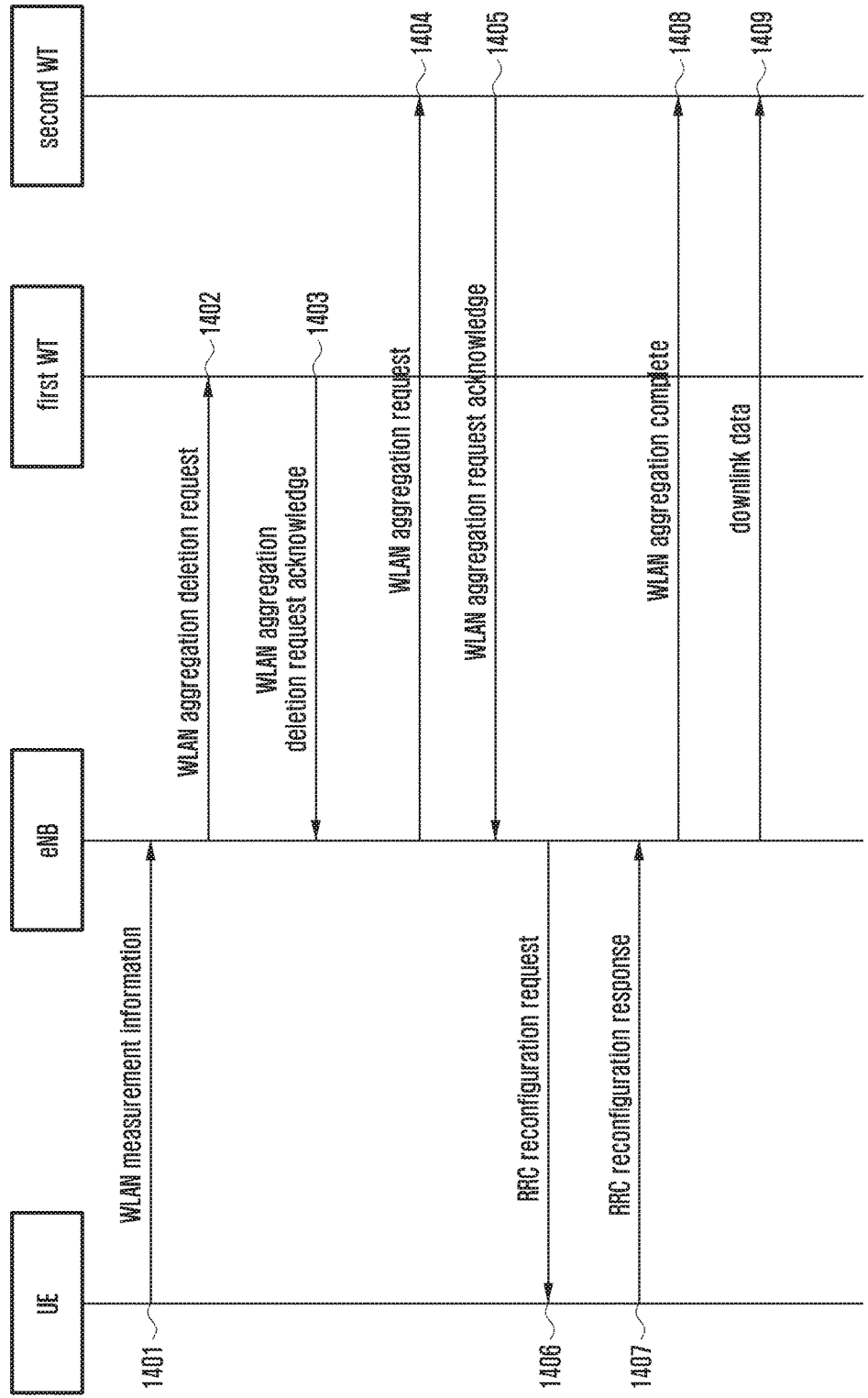
FIG. 14 is a flowchart illustrating a method for controlling a WLAN bearer according to various embodiments of the present disclosure.

FIG. 14 is a flowchart illustrating a method for controlling a WLAN bearer according to various embodiments of the present disclosure. The method includes the following operations.

Referring to FIG. 14, at operation 1401, a base station receives WLAN measurement information of a UE.

In some examples, the WLAN measurement information received by the base station indicates an identifier of a WLAN node. The base station may directly obtain WLAN information of measured WLAN nodes from the WLAN measurement information, or the base station may obtain the WLAN information of the measured WLAN nodes from WLAN information obtained by an associated WT.

After learning that the WLAN node whose WLAN information satisfies the WLAN aggregation threshold condition is not included in the current WLAN aggregation of the UE and that WLAN information of a candidate target WLAN node of the WLAN aggregation satisfies the WLAN aggregation threshold condition, the base station may delete the WLAN aggregation of the current WT (called a first WT hereinafter), re-select a WT (called a second WT hereinafter) for the UE to establish the WLAN aggregation, and send modified WLAN aggregation configuration information to the UE.

The WLAN nodes of the current WLAN aggregation of the UE and the candidate target WLAN node of the WLAN aggregation are described at 401 and will not be described again here.

The WLAN aggregation configuration information is described at 701 and will not be described again here.

At operation 1402, the base station sends a WLAN aggregation deletion request to the first WT, and stops sending data of the UE to the first WT.

At operation 1403, the base station receives a WLAN aggregation deletion acknowledge from the first WT.

At operation 1404, the base station sends a WLAN aggregation establishing request message to the second WT. In some examples, the WLAN aggregation establishing request message includes WLAN aggregation request information. The WLAN aggregation request information is described at 501 and will not be described again here.

At operation 1405, the base station receives a WLAN aggregation establishing request acknowledgement message from the second WT. In some examples, the message indicates WLAN aggregation response information. The WLAN aggregation response information is described at 502 and will not be described again here.

At operation 1406, the base station modifies the WLAN aggregation configuration information of the UE according to the WLAN aggregation response information sent by the second WT, and sends the modified WLAN aggregation configuration information to the UE via a RRC reconfiguration request message or a new RRC message. The WLAN aggregation configuration information is described at 701 and will not be described again here.

At operation 1407, the UE sends an RRC reconfiguration response message or a new RRC message to the base station to indicate that modification of WLAN aggregation configuration of the UE is complete.

At operation 1408, in some examples, after learning that the modification of WLAN aggregation configuration of the UE is complete, the base station may send a WLAN aggregation complete message to the WT.

At operation 1409, the base station sends the downlink data to the WT.

Figure 15:
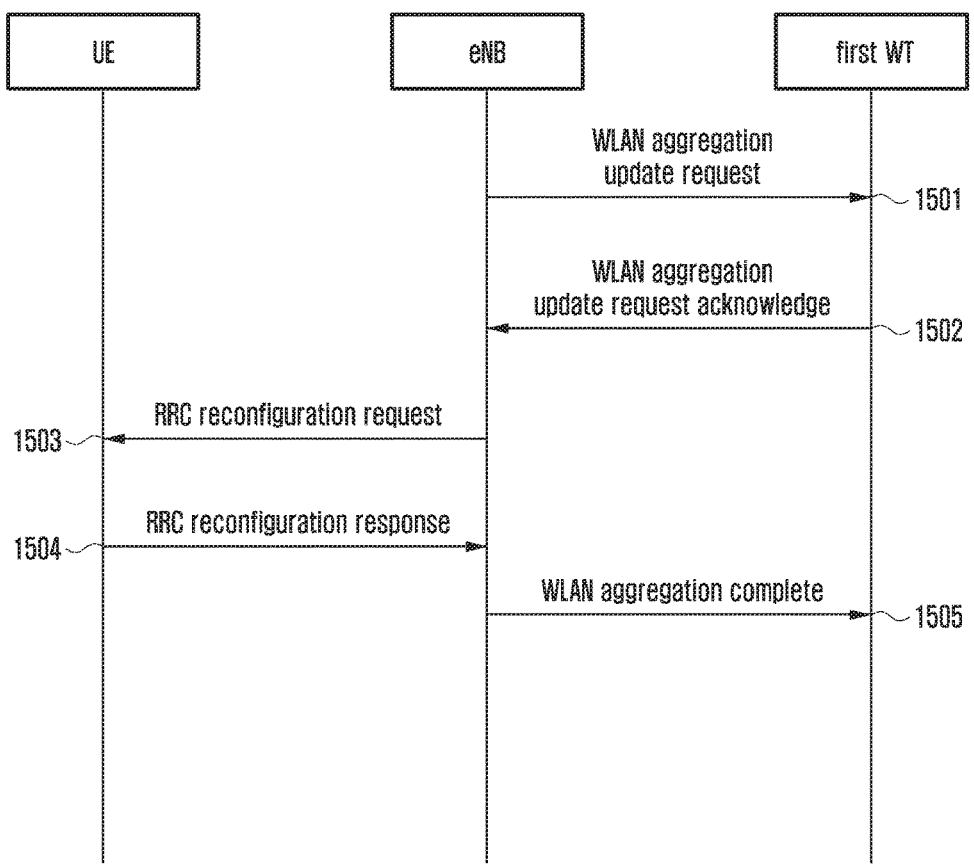
FIG. 15 is a flowchart illustrating a method for controlling a WLAN bearer according to various embodiments of the present disclosure.

FIG. 15 is a flowchart illustrating a method for controlling a WLAN bearer according to various embodiments of the present disclosure. In some examples, a WLAN node and a WT may be merged together. The method includes the following operations.

Referring to FIG. 15, at operation 1501, a base station sends a WLAN aggregation update request to a WT. In some examples, the WLAN aggregation update request includes WLAN update information which is described at operation 501 and will not be described again here.

At operation 1502, the base station receives a WLAN aggregation update request acknowledgement message from the WT. In some examples, the message includes WLAN aggregation update response information which is described at operation 502 and will not be described again here.

At operation 1503, the base station sends the WLAN aggregation update response information to the UE via an RRC reconfiguration request message or a new RRC message. The WLAN aggregation update response information is described at operation 701 and will not be described again here.

At operation 1504, the UE sends an RRC reconfiguration response message or a new RRC message to indicate that configuration of the WLAN aggregation of the UE is complete.

At operation 1505, in some examples, the base station may send WLAN aggregation update complete information to the WT after learning that the configuration of the WLAN aggregation of the UE is complete.

Figure 16:
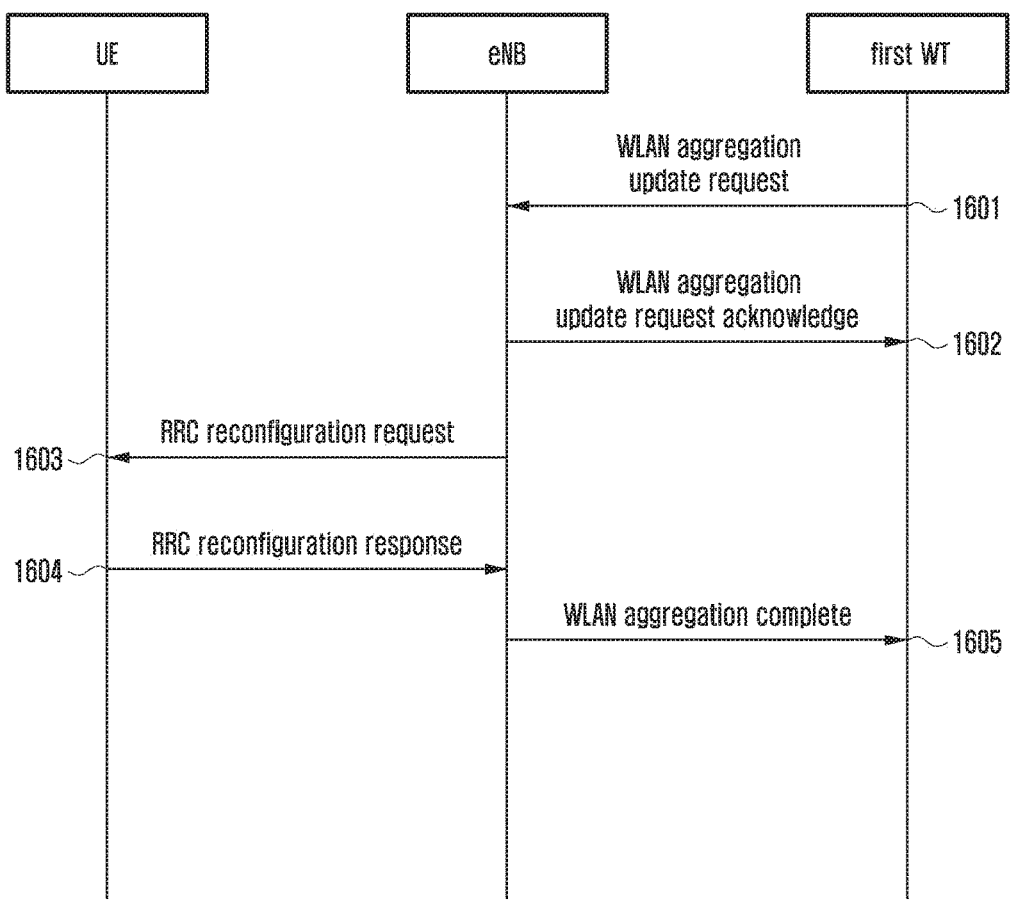
FIG. 16 is a flowchart illustrating a method for controlling a WLAN bearer according to various embodiments of the present disclosure.

FIG. 16 is a flowchart illustrating an method for controlling a WLAN bearer according to various embodiments of the present disclosure. In the method, the fifth method and the sixth method are combined. In some examples, a WLAN node and a WT may be merged together. The method includes the following operations.

Referring to FIG. 16, at operation 1601, a WT sends a WLAN aggregation update request to a base station. In some examples, the WLAN aggregation update request includes WLAN update information which is described at operation 801 and will not be described again here.

At operation 1602, the base station sends a WLAN aggregation update request acknowledgement message to the WT. In some examples, the message includes WLAN aggregation update response information which is described at operation 802 and will not be described again here.

At operation 1603, the base station sends WLAN aggregation configuration information to the UE via an RRC reconfiguration request message or a new RRC message. The WLAN aggregation configuration information is described at operation 701 and will not be described again here.

At operation 1604, the UE sends an RRC reconfiguration response message or a new RRC message to indicate that configuration of the WLAN aggregation of the UE is complete.

At operation 1605, in some examples, the base station may send WLAN aggregation update complete information to the WT after learning that the configuration of the WLAN aggregation of the UE is complete.

The methods of controlling the WLAN bearer in the present disclosure are described, and the present disclosure also provides a base station and a UE to apply the above methods.

Figure 17:
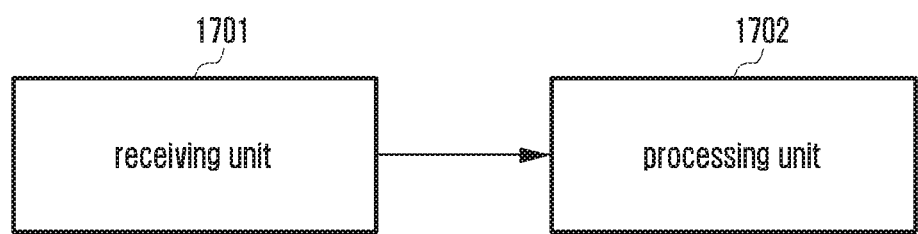
FIG. 17 is a schematic diagram illustrating a base station according to various embodiments of the present disclosure.

The base station device provided by the present disclosure is shown in FIG. 17.

FIG. 17 is a schematic diagram illustrating a base station according to various embodiments of the present disclosure.

Referring to FIG. 17, the base station includes a receiving unit 1701 and a processing unit 1702. The receiving unit 1701 is configured to receive information including at least one of WLAN information of a WLAN node, WLAN measurement information, WLAN aggregation response information, WLAN aggregation update response information, WLAN aggregation update information, and a WLAN capability of UE. The processing unit 1702 is configured to, according to the information received by the receiving unit, instruct the UE to perform traffic steering between the EUTRAN and the WLAN, or instruct the UE to perform control processing for the EUTRAN and WLAN aggregation. In some examples, the processing unit 1702 is configured to, according to the information received by the receiving unit, configure RAN assistant information for the UE to instruct the UE to perform the traffic steering between the EURTAN and the WLAN, or configure WLAN aggregation configuration information for the UE, or configure WLAN measurement for the UE, or decide whether to establish, modify, or delete the WLAN aggregation.

Figure 18:
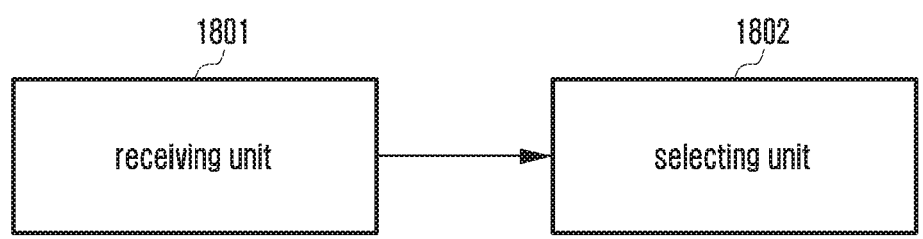
FIG. 18 is a schematic diagram illustrating a UE according to various embodiments of the present disclosure.

The UE provided by the present disclosure is shown in FIG. 18.

FIG. 18 is a schematic diagram illustrating a UE according to various embodiments of the present disclosure.

Referring to FIG. 18, the UE includes a receiving unit 1801 and a selecting unit 1802. The receiving unit 1801 is configured to receive WLAN aggregation configuration information sent by the base station. The selecting unit 1802 is configured to select a WLAN node to initiate an association/re-association according to the WLAN aggregation configuration information.

As can be seen from the above technical solutions, the base station obtains dynamic and static WLAN information of the WLAN nodes by performing interoperations with the WT and the UE, thereby reducing a large number of workloads caused by manual configurations. According to the configured WLAN aggregation condition and the interoperations with the WT and the UE, when the UE moves between the WLAN nodes, signaling of control and Uu ports of the base station is reduced, continuity of receiving data is maintained for the UE, throughput of the UE is increased, and increasing data communication requirements of the UE are satisfied.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method for performing a long-term evolution (LTE) and a wireless local area network (WLAN) aggregation by a base station, the method comprising:
   determining, by the base station, to establish a WLAN aggregation for a user equipment (UE);
   sending, by the base station to a WLAN termination (WT), WLAN aggregation request information including a WLAN identifier and an identifier of a public land mobile network (PLMN) for the UE;
   receiving, by the base station from the WT, WLAN aggregation response information indicating a confirmation of a WT association between the WLAN and the UE in response to the WLAN aggregation request information; and
   receiving, from the WT, WLAN information for an WLAN node, the WLAN information including at least one of an identifier of a WLAN node, and a maximum supported data rate corresponding to the identifier of the WLAN node.

2. The method of claim 1, wherein the WLAN aggregation request information further comprises at least one of:
   an identifier of the UE,
   eNB UE XwAP ID, and
   information of bearer on the base station side.

3. The method of claim 1, further comprising:
   sending, to the WT, downlink data for the UE if the UE is associated with the WLAN according to the WLAN aggregation response information.

4. The method of claim 1, wherein the identifier of the WLAN node includes at least one of a service set identifier (SSID), a basic SSID (BSSID), a homogeneous extended SSID (HESSID).

5. The method of claim 1, further comprising:
   receiving, from the WT, status information for the WT, the status information including at least one of a basic service set (BSS) load, and a channel utilization rate.

6. A method for performing a long-term evolution (LTE) and a wireless local area network (WLAN) aggregation by a WLAN termination (WT), the method comprising:
   receiving, by the WT from a base station, WLAN aggregation request information including a WLAN identifier and an identifier of a public land mobile network (PLMN) for a user equipment (UE), if the WLAN aggregation is determined to establish the WLAN aggregation for the UE;
   sending, by the WT to the base station, WLAN aggregation response information indicating a confirmation of a WT association between the WLAN and the UE in response to the WLAN aggregation request information;
   sending, to the base station, WLAN information for an WLAN node, the WLAN information including at least one of an identifier of a WLAN node, and a maximum supported data rate corresponding to the identifier of the WLAN node.

7. The method of claim 6, wherein the WLAN aggregation request information further comprises at least one of:
   an identifier of the UE,
   eNB UE XwAP ID, and
   information of bearer on the base station side.

8. The method of claim 6, further comprising:
   receiving, from the base station, downlink data for the UE if the UE is associated with the WLAN according to the WLAN aggregation response information.

9. The method of claim 6, wherein the identifier of the WLAN node includes at least one of a service set identifier (SSID), a basic SSID (BSSID), a homogeneous extended SSID (HESSID).

10. The method of claim 6, further comprising:
    sending, to the base station, status information for the WT, the status information including at least one of a basic service set (BSS) load, and a channel utilization rate.

11. A base station for performing a long-term evolution (LTE) and a wireless local area network (WLAN) aggregation, the base station comprising:
   a transceiver; and
   a controller coupled with the transceiver and configured to control to:
      determine to establish a WLAN aggregation for a user equipment (UE),
      send, to a WLAN termination (WT), WLAN aggregation request information including a WLAN identifier and an identifier of a public land mobile network (PLMN) for the UE, and
      receive, from the WT, WLAN aggregation response information indicating a confirmation of a WT association between the WLAN and the UE in response to the WLAN aggregation request information, and
      receive, from the WT, WLAN information for an WLAN node, the WLAN information including at least one of an identifier of a WLAN node, and a maximum supported data rate corresponding to the identifier of the WLAN node.

12. The base station of claim 11, wherein the WLAN aggregation request information further comprises at least one of:
   an identifier of the UE,
   eNB UE XwAP ID, and
   information of bearer on the base station side.

13. The base station of claim 11, wherein the controller is further for sending, to the WT, downlink data for the UE if the UE is associated with the WLAN according to the WLAN aggregation response information.

14. A wireless local area network (WLAN) termination (WT) for performing a long-term evolution (LTE) and a WLAN aggregation, the WT comprising:
   a transceiver; and
   a controller coupled with the transceiver and configured to control to:
      receive, from a base station, WLAN aggregation request information including a WLAN identifier and an identifier of a public land mobile network (PLMN) for a user equipment (UE), if the WLAN aggregation is determined to establish the WLAN aggregation for the UE,
      send, to the base station, WLAN aggregation response information indicating a confirmation of a WT association between the WLAN and the UE in response to the WLAN aggregation request information, and
      send, to the base station, WLAN information for an WLAN node, the WLAN information including at least one of an identifier of a WLAN node, and a maximum supported data rate corresponding to the identifier of the WLAN node.

15. The WT of claim 14, wherein the WLAN aggregation request information further comprises at least one of:
   an identifier of the UE,
   eNB UE XwAP ID, and
   information of bearer on the base station side.

16. The WT of claim 14, wherein the controller is for receiving, from the base station, downlink data for the UE if the UE is associated with the WLAN according to the WLAN aggregation response information.

\* \* \* \* \*